April 29, 1930.   J. A. PLOURDE ET AL   1,756,304
COMBINED RIM TOOL AND TIRE CARRIER
Filed Jan. 23, 1929    3 Sheets-Sheet 1

Inventors
Joseph A. Plourde,
Adelord J. Tetreault,
By J. Stanley Burch
Attorney

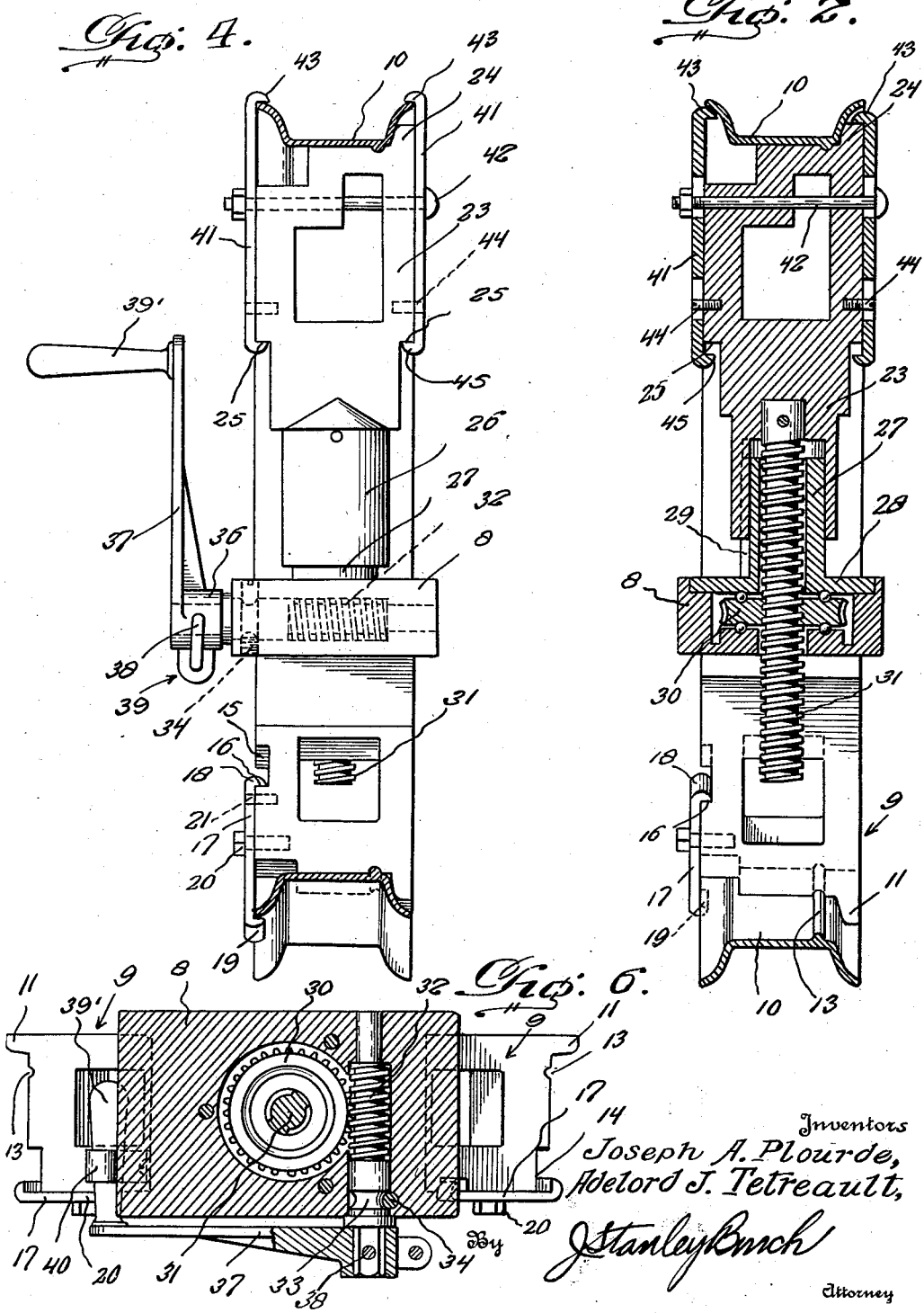

April 29, 1930.　　J. A. PLOURDE ET AL　　1,756,304
COMBINED RIM TOOL AND TIRE CARRIER
Filed Jan. 23, 1929　　3 Sheets-Sheet 3
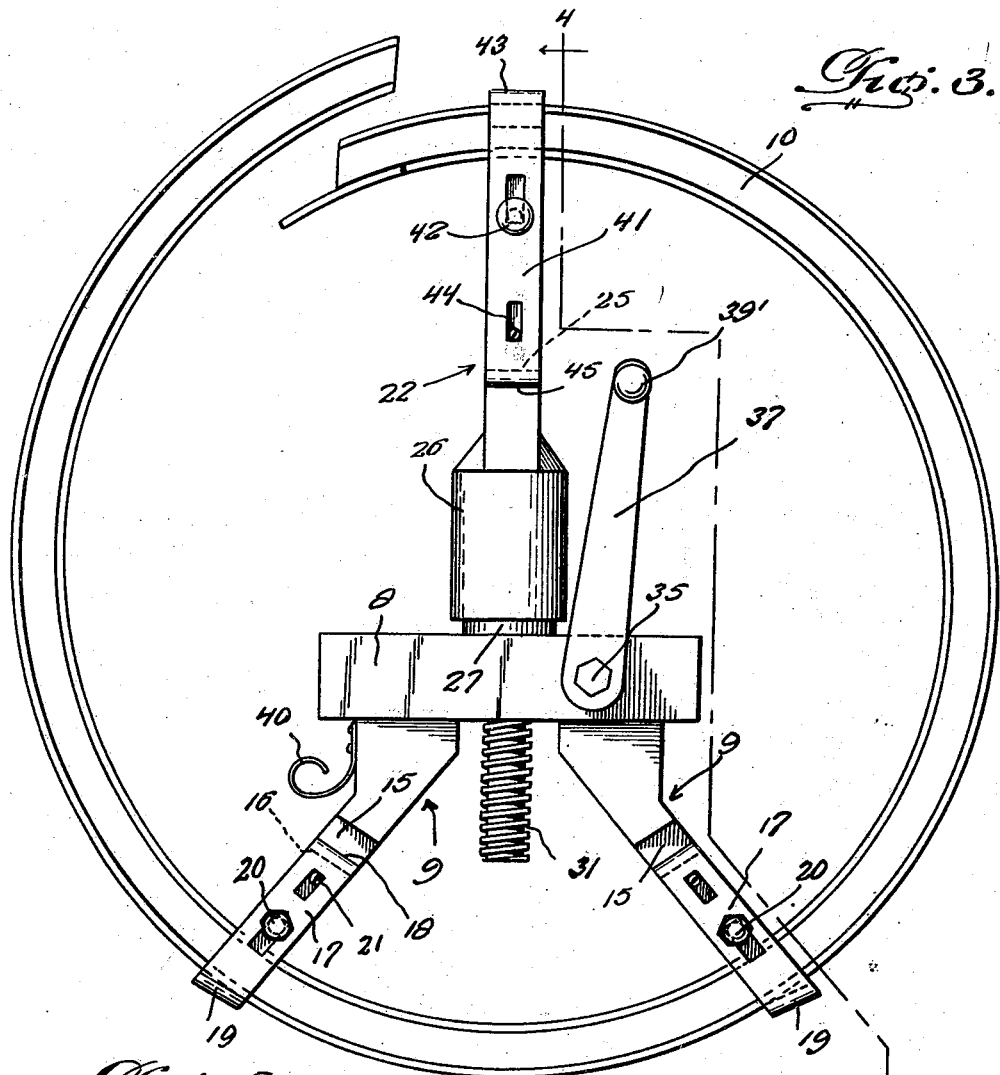
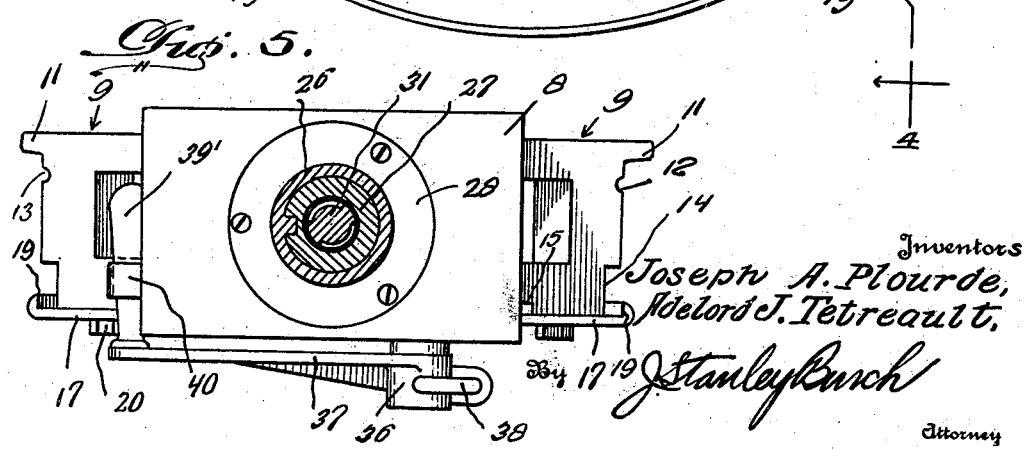
Inventors
Joseph A. Plourde,
Adelord J. Tetreault,
By Stanley Burch
Attorney Patented Apr. 29, 1930

1,756,304

UNITED STATES PATENT OFFICE

JOSEPH A. PLOURDE AND ADELORD J. TETREAULT, OF CHICOPEE FALLS, MASSACHUSETTS

COMBINED RIM TOOL AND TIRE CARRIER

Application filed January 23, 1929. Serial No. 334,409.

This invention relates to a compound automotive appliance of the type adapted to be mounted upon an automobile in a convenient place, and constructed to operate as a spare tire carrier, and as a tool for expanding and contracting split tire rims to facilitate application and removal of tires.

The invention has more specific reference to a structure of this class which includes a relatively stationary body, a pair of rigidly mounted radially extending rim-engaging arms, and a third radially extensible arm, means on the outer ends of the arms for engaging the tire rim, and means for facilitating operation of said radially extensible arms.

In carrying out the improved invention, we have evolved and produced a structure wherein novelty is predicated upon the utilization of distinguishable clamping elements carried by the outer ends of said arms and relatively adjustable with respect to the arms, whereby to permit said elements to be retracted inwardly to dispose them out of the way when not in use, or to be extended or projected outwardly to engage over the flanges of the tire rim when the device is employed for contracting and expanding purposes.

More specifically stated, additional novelty is embraced in the employment of clamping elements in the form of slidably mounted links, having hooks at their outer ends to engage the tire rim, and having hooks at their inner ends to engage shoulders on the complemental arms, whereby to relieve their attaching bolts of shearing strains, and to thereby provide an unusually steady and dependable structure.

An equally important structural advantage is found in the operating means for the extensible arm, said means being distinguished by a rotary operating shaft carrying a detachable and reversible hand crank, said crank being held in either of its two effective positions by a pad lock, and said crank being so made as to give it the additional function of a wrench for tightening bolts such as are utilized to hold the clamping elements in different adjusted positions.

Other features and advantages of the invention will become more readily apparent from the following description and drawings.

In the drawings:

Figure 3 is a view like Figure 1 showing the manner in which the device is utilized as a tire rim contracting tool.

Figure 4 is a sectional view taken on the plane of the irregular line 4—4 of Figure 3.

Figure 5 is a horizontal section on the line 5—5 of Figure 1.

Figure 6 is a horizontal sectional view taken approximately upon the plane of the line 6—6 of Figure 1; and Figure 7 is a longitudinal sectional view through one of the stationary arms, taken approximately on the plane of the line 7—7 of Figure 1.

Figure 1:
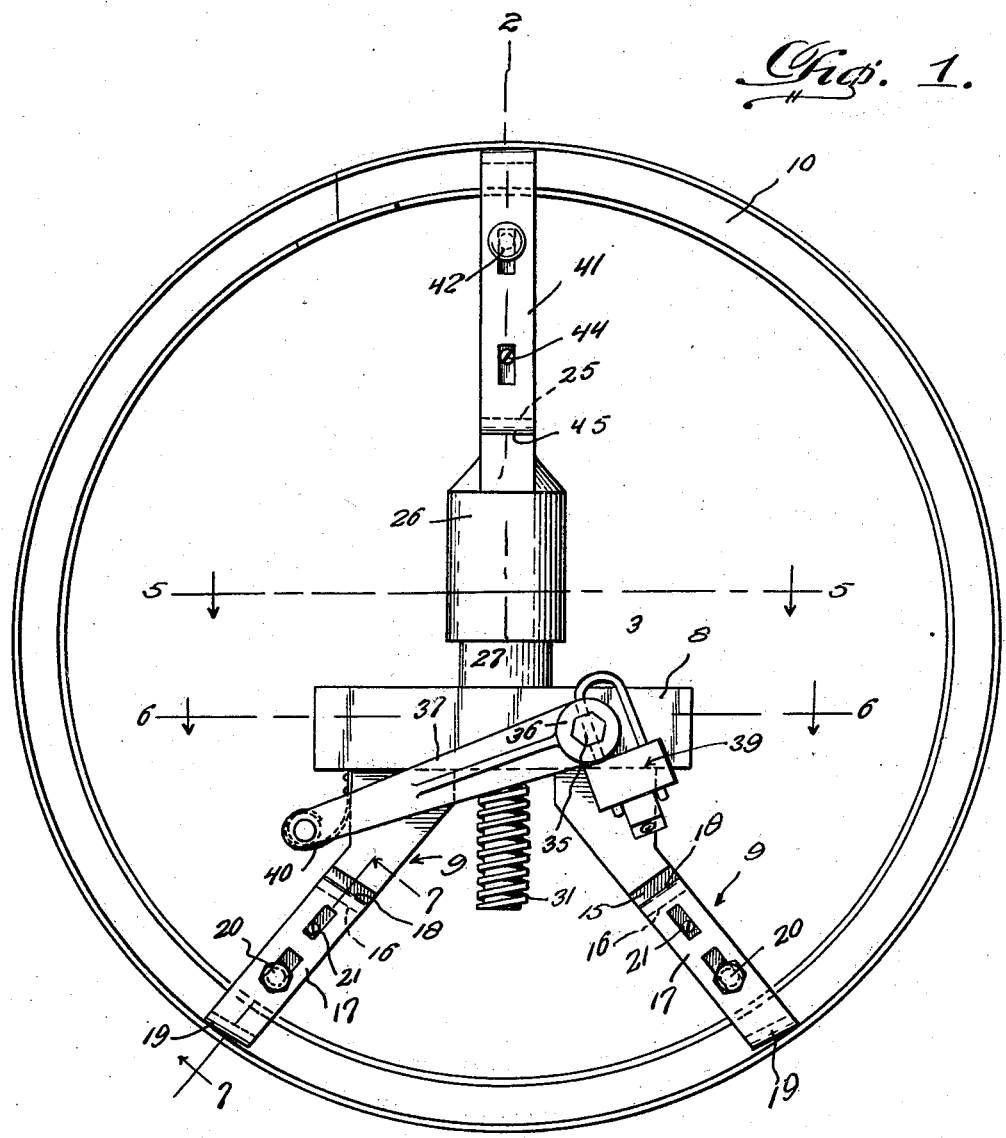
Figure 1 is a rear elevational view of a device constructed in accordance with the present invention showing the manner in which it is employed as a tire carrier.

Referring now to the drawings, by reference numerals, it will be observed that 8 designates generally a block-like body which is adapted to be rigidly attached to an appropriate portion of the car. Fastened rigidly to the under side of this body and radiating downwardly and outwardly therefrom are duplicate arms 9. These arms are adapted to abut the inner periphery of the tire rim 10. This rim is of the transversely split type. The outer end of each arm 9 is fashioned to engage and conform to the shape of the rim with which it is engaged. For example as better shown in Figure 5 each arm is formed on its inner side with an extension lug 11 adjacent to which is a groove 12 such as serves to accommodate a bead 13 of the type shown in Figure 2. It may be stated in this connection that some rims are provided with this bead, for which reason we have found it advisable to provide the groove 12 to accommodate it. In connection with the lugs 11 it is observed that these engage the inner flange of the rim as clearly shown in Figure 2 for example.

It has also been found advisable to form a notch 14 on the opposite edge of the arm to accommodate lugs (not shown) such as are sometimes provided on rims of this class. The gist of the outer end construction of each arm is that the shape is such as to provide a lug for engaging the rim flange and to make the remainder such as to conform to irregularities in shape of the inner periphery of the rim. While considering these arms 9 we deem it consistent to mention that on the edge opposite to the lug 11 there is a notch 15, one end of which functions as a shoulder 16. An adjustable clamping element is associated with these details. We have found it advisable to make the clamping element in the form of an extensible link 17 having a hook 18 on its inner end to engage the shoulder 16 and having a hook 19 on its outer end to take over the rim flange as shown plainly in Figure 4. A retaining bolt 20 is employed to maintain the link in place as well as to hold it in adjusted position. Also a small guide screw 21 is provided and extends through a slot in the inner end of the link to prevent pivotal movement of the link and to aline the hook 18 with its shoulder 16. In this connection it is to be stated that the purpose of this hook and shoulder is obviously to equally distribute the strain and to relieve the connecting bolts 20 of shearing stress.

Cooperating with the two arms 9 is a third radially extensible arm generally designated by the reference character 22, this being adjustably mounted on the central portion of the body at a point between the arms 9. This arm comprises a peculiarly shaped casting including a body portion 23 having its outer end shaped to engage the adjacent portion of the rim and equipped with a flange-engaging lug 24. This body portion is cut away on opposite longitudinal edges to provide a pair of shoulders 25 which serve in a manner to be hereinafter described. The inner end of the body carries a socket 26 fitting telescopically over a complemental nipple 27 (see Fig. 2). This nipple is formed integral with a disk-like cover plate 28 bolted down on the main body 8 and covering a recess formed in this body. Incidentally, the nipple 27 has a longitudinal slot 29 on one side forming a key-way and the socket 27 has an internal rib providing a key which is slidable in the key-way, whereby to permit relative sliding movement of the body 23, but to prevent relative rotation.

Figure 2:
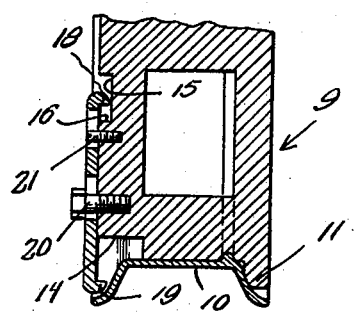
Figure 2 is a vertical sectional view taken approximately upon the plane of the line 2—2 of Figure 1.

The recess in the body 8 functions as a housing for a worm nut 30 as shown in Figure 2 and this nut is threaded on a feed screw 31 which is fastened at its outer end to the adjustable body 23, said screw extending through and beyond the nipple 27 as here shown.

Referring now to Figure 6 it will be observed that reference character 32 designates a worm shaft journaled for rotation in suitable bearings in the body 8. The threads of this worm are positioned to engage the teeth of the worm nut 30. The bore in which this shaft is mounted is so made as to facilitate assembly of the parts. It has been found for instance that the shaft may be provided with an annular groove 33 and that a removable retaining screw 34 may be employed to hold the shaft in position. The polygonal end portion 35 of the shaft is constructed to accommodate the socket portion 36 of a removable hand crank 37. This socket as well as the end portion 35 of the shaft is formed with openings to accommodate the channel 38 of a pad lock 39, the pad lock serving to hold the hand crank in the reverse position as shown in Figure 6 or in the operating position shown in Figure 4. The hand crank is of course provided with an appropriate hand grip 39′ and we have found it convenient to provide a spring clip 40 with which this hand grip may be releasably engaged as shown in Figure 6 when the hand grip is reversed.

It is obvious that adjustable retaining elements are also provided on the outer end of the extensible arm 22. We have found it advisable to provide a pair of links 41 like the link 17 already described. A single retaining bolt 42 passes through the body 23 transversely and through slots in the intermediate portions of the links to hold these links simultaneously in place and to allow them to be swung outwardly a sufficient distance to permit the hook 43 on the outer end to clear the rim flanges and to be engaged over the rim flanges as shown in Figure 4. Guide screws 44 are also provided here and cooperate with the inner slotted end portions of the links. In addition the links are formed on their inner ends with hooks 45 engageable with the aforesaid shoulders 25 to relieve the bolt 42 of shearing strain. For sake of convenience in broadly defining the links, they are also hereinafter referred to as adjustable clamps.

As before stated, this improved device is featured as a compound structure in that it may be successfully utilized as a stationary spare tire carrier and as a convenient tool for expanding and contracting transversely split tire rims. When using the structure as a tire carrier, the parts are arranged as shown in Figure 1. As here shown the various hooked clamping elements are retracted inwardly and their retaining bolts are fastened to bind them in these positions. This disposes the outer hooked ends of such elements within the diameter of the completely expanded rim. The outer ends of the three radial arms are adjusted so as to bring them into abutting and forceful contact with the inner periphery of the rim. It is observed however that the hooked clamping elements together with the projecting lugs on the outer ends of the arms serve to prevent displacement of the rim when the device is employed as a tire carrier. It is also to be noted that when the device is thus used, the hand crank is in reversed position, that is, the hand grip is turned inwardly and engaged with the spring clip 40 and the pad lock is put in position to hold the hand crank in this position. Hence, the tire rim is conveniently locked on the carrier.

It is evident that in adjusting the radially extensible arm 22 this is accomplished by fitting the hand crank on the worm shaft in the position shown in Figure 4 for example and turning the worm shaft to in turn rotate the worm nut and the feed screw on which it is mounted. This expands or retracts the relatively movable portion of this particular arm.

In employing the device as a rim tool for instance in contacting the rim as shown in Figure 3, the hooked clamps are extended outwardly beyond the outer ends of the arms and the hooks on the outer ends of these clamps are engaged over the rim flanges as shown in Figure 4. Then with the hand crank in proper rotating position, the device may be employed for either contracting or expanding the rim in an obvious manner.

A careful consideration of the description in conjunction with the drawings will enable the reader to obtain a clear understanding of the construction, operation and advantages. Therefore, a more lengthly description is regarded unnecessary.

Minor changes in shape, size and rearrangement of details coming within the field of the invention claimed may be resorted to in actual practice if desired.

We claim:

In a device of the class described, a relatively fixed body, a pair of rigid rim-engaging arms provided at their outer ends with rim contacting lugs on one side, a pair of links adjustably mounted by means of a pin on the opposite sides of said arms, said links being provided at their outer ends with rim-engaging hooks, and being also provided at their inner ends with additional hooks, said arms being formed with shoulders with which said last named hooks are engaged to relieve the pin of shearing strain, a guide screw in said arm extending through a slot in said link to prevent pivotal movement of link, and an adjustable arm on said body provided with rim-engaging means at its outer end.

In testimony whereof we affix our signatures.

ADELORD J. TETREAULT.
JOSEPH A. PLOURDE.